May 27, 1930.  A. E. KEMMERLING  1,760,364
PREDATORY BIRD DECOY
Filed April 24, 1928
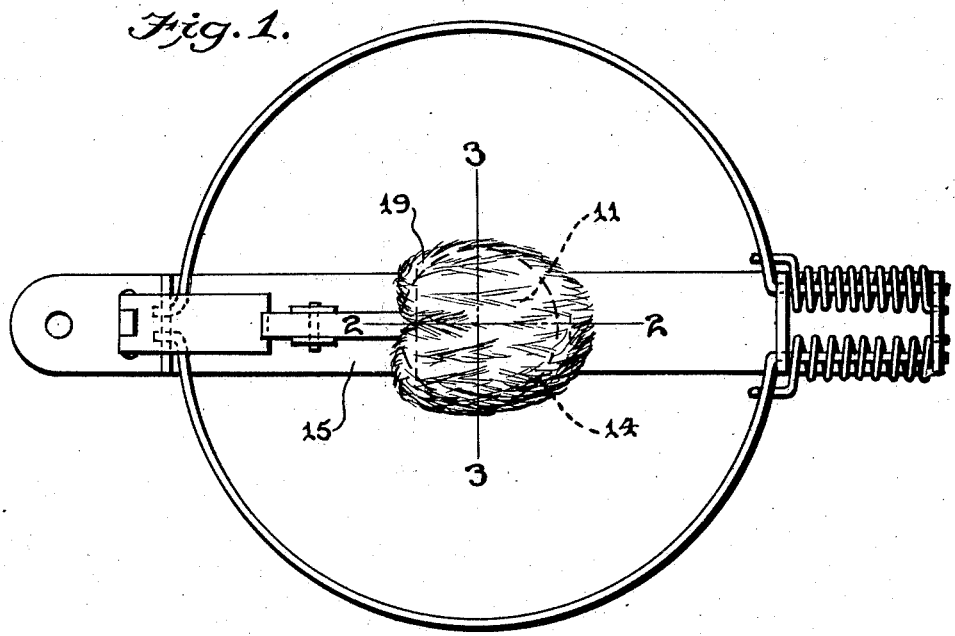
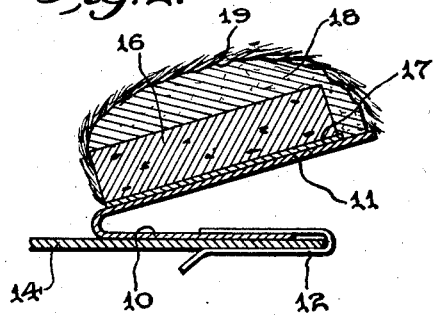 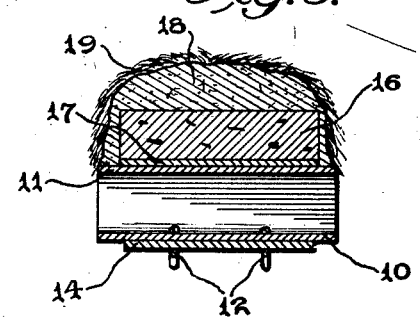
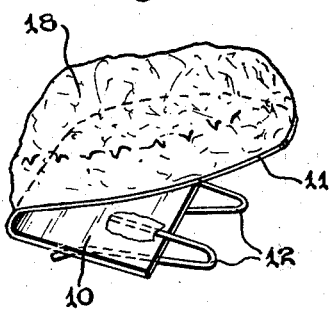
INVENTOR.
A. E. Kemmerling
BY
ATTORNEY.

Patented May 27, 1930

1,760,364

UNITED STATES PATENT OFFICE

ARTHUR E. KEMMERLING, OF WILKINSBURG, PENNSYLVANIA

PREDATORY-BIRD DECOY

Application filed April 24, 1928. Serial No. 272,509.

The object of the invention is to provide a lure or decoy readily adaptable for application to the pan or trip plate of an ordinary steel trap to serve as a means for inducing predatory birds such as hawks and owls, to actuate the trap and thereby be caught by the legs; to provide a device of this nature which will be readily thrown off the trap plate, during the struggles of the victim, and thereby be saved from damage, so that it may again be used upon resetting of the trap; and to provide a decoy which is of simple form and therefore susceptible of cheap manufacturing and low marketing cost.

With this object in view, the invention consists in a construction and combination of parts of which a preferred embodiment is illustrated in the accompanying drawings wherein:

Figure 1 is a plan view of a conventional steel trap with the jaws set and the invention applied in operative position on the trip plate or pan.

Figure 2 is a sectional view on the plane indicated by the line 2—2 of Figure 1.

Figure 3 is a sectional view on the plane indicated by the line 3—3 of Figure 1.

Figure 4 is a perspective view of the device with the feathers omitted.

The base of the device consists preferably of a piece of sheet tin bent back upon itself to provide spaced lower and upper plates 10 and 11, of which the latter is yieldingly movable toward the former by reason of the resilience of the material. Secured to the bottom plate 10 are the spring clips 12, which may be soldered or otherwise attached to suit. The clips 12 constitute the means for attaching the base to the pan or trip plate 14 of the trap 15.

On the upper face of the top plate 11 is mounted the body of the decoy, this consisting of a filler block 16 made preferably of cork and adhesively secured as at 17 to the top plate, the filler block being covered with a paste 18 which serves as a securing means for the feathers 19.

The adhesive means at 17 is a waterproof cement made preferably from a waterproof glue and to this is added cork flour until the composition reaches the consistency of a thick paste. This paste not only constitutes the adhesive means 17 but also the feather securing means 18.

Since it is generally the case that a resting bird draws its head into its feathers, no need exists for having the head appear on the decoy, it being as effective as a lure as if it were equipped with a head.

The feathers to be applied may be selected to simulate the bird to be represented.

When the trap is set the device is applied to the pan or trip plate by slipping the clips into engagement with the pan, so that the bottom plate 10 rests on top of the pan. The bird sought to be caught will then approach the trap feet first and immediately upon gripping the decoy, will trip the pan and therefore spring the trap, being caught by the legs between the jaws of the trap. By forming the base of double plate construction with the one having a spring tendency away from the other, the base is of a form to absorb the shock from the gripping action of the trap victim, and if the device is not released from the pan at the instant of springing the trap, it will readily be thrown off by the struggles of the entrapped victim.

The invention having been described, what is claimed as new and useful is:

1. A device for the purpose indicated consisting of a base, a feather covered body mounted on the base, and trap pan attaching means carried by the base, the base consisting of upper and lower plates resiliently connected, the body being carried by one of said plates and the attaching means by the other.

2. A device for the purpose indicated consisting of a base, a feather covered body mounted on the base, and trap pan attaching means carried by the base, the body consisting of a cork filler block cemented to the base, and a paste spread over the filler block and in adhesion with the feathers.

In testimony whereof he affixes his signature.

ARTHUR E. KEMMERLING.